United States Patent
Matsumoto et al.

(10) Patent No.: US 12,457,090 B2
(45) Date of Patent: Oct. 28, 2025

(54) VEHICLE-MOUNTED DEVICE, VEHICLE-MOUNTED COMMUNICATION SYSTEM, AND TIME SYNCHRONIZATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tadashi Matsumoto, Yokkaichi (JP); Kazuki Kitagawa, Yokkaichi (JP); Kazuyuki Inoue, Yokkaichi (JP); Yojiro Suyama, Osaka (JP); Tatsuya Izumi, Osaka (JP); Hideyuki Tanaka, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/574,013

(22) PCT Filed: Jun. 27, 2022

(86) PCT No.: PCT/JP2022/025516
§ 371 (c)(1),
(2) Date: Dec. 23, 2023

(87) PCT Pub. No.: WO2023/282107
PCT Pub. Date: Jan. 12, 2023

(65) Prior Publication Data
US 2024/0372694 A1    Nov. 7, 2024

(30) Foreign Application Priority Data
Jul. 7, 2021 (JP) .................. 2021-112535

(51) Int. Cl.
H04L 7/00 (2006.01)
H04L 7/033 (2006.01)

(52) U.S. Cl.
CPC .......... *H04L 7/0033* (2013.01); *H04L 7/0335* (2013.01)

(58) Field of Classification Search
CPC ................ H04L 7/0335; H04L 7/0033; H04L 2012/40273; H04L 7/00; H04J 3/0667; B60R 16/023
See application file for complete search history.

(56) References Cited

U.S. PATENT DOCUMENTS

2013/0077659 A1   3/2013   Okuda
2020/0195619 A1   6/2020   Iwata et al.
(Continued)

FOREIGN PATENT DOCUMENTS

JP   2016-005214 A   1/2016
JP   2016-219870 A   12/2016

OTHER PUBLICATIONS

International Search Report for PCT/JP2022/025516 issued on Jan. 1, 2023.

*Primary Examiner* — Aristocratis Fotakis
(74) *Attorney, Agent, or Firm* — Honigman LLP

(57) ABSTRACT

A vehicle-mounted device stores delay time information of a first set and a second set. The first set includes a first transmission delay time from an external portion to a measurement reference position at a data reception time, and a second transmission delay time from an external portion to a measurement reference position at a data reception time in another device. The second set includes a third transmission delay time from a measurement reference position to an external portion at a data transmission time, and a fourth transmission delay time from a measurement reference position to an external portion at a data transmission time in (Continued)

the other device. A propagation delay time between the devices is measured by time synchronization information to and from the other device, the measured propagation delay time is corrected based on the stored delay time information, and time synchronization between the devices is performed.

6 Claims, 10 Drawing Sheets

(56) References Cited

U.S. PATENT DOCUMENTS

| | | | |
|---|---|---|---|
| 2021/0006435 A1* | 1/2021 | Iwata | H04L 12/40169 |
| 2021/0320738 A1* | 10/2021 | Mizukoshi | H04W 4/48 |
| 2022/0150854 A1* | 5/2022 | Patil | H04J 3/0682 |
| 2023/0019699 A1* | 1/2023 | Zinner | H04L 12/40 |

* cited by examiner

FIG. 9

| VEHICLE-MOUNTED DEVICE | DIRECTION | TRANSMISSION DELAY TIME |
|---|---|---|
| SWITCH DEVICE 101A (COMMUNICATION PORT54B) | Tx | T42 |
|  | Rx | T41 |
| FUNCTION UNIT 111B | Tx | T31 |
|  | Rx | T32 |

Stb

VEHICLE-MOUNTED DEVICE, VEHICLE-MOUNTED COMMUNICATION SYSTEM, AND TIME SYNCHRONIZATION METHOD

CROSS-REFERENCE TO RELATED APPLICATIONS

This application is the U.S. National Stage of PCT/JP2022/025516 filed, Jun. 27, 2022, which claims priority of Japanese Patent Application No. 2021-112535, filed Jul. 7, 2021, the contents of which are incorporated herein.

TECHNICAL FIELD

The present disclosure relates to a vehicle-mounted device, a vehicle-mounted communication system, and a time synchronization method.

BACKGROUND

Japanese Patent Laid-Open No. 2016-5214 discloses the following network system. That is, the network system forms a time-synchronized network whose network configuration does not change dynamically, and is provided with a plurality of nodes including a node that functions as a master. Each node includes a storage means for storing synchronization information including master information indicating the master and topology information indicating a logical topology of the time-synchronized network, and a control means for controlling the own node. As a result of the control means using the synchronization information stored in the storage means as synchronization information of the own node in the time-synchronized network to activate the own node, the time-synchronized network is formed.

Also, a technology that performs time synchronization has been developed, taking into consideration that, when a specific device synchronizes time information with another device, the time required for MAC processing performed by the specific device varies according to the state of the system. For example, Japanese Patent Laid-Open No. 2016-219870 (Patent Document 2) discloses a time synchronization control device such as the following. Specifically, the time synchronization control device includes: a storage unit that stores, as second time information, current time information output from a time output unit when an input signal including first time information received from an external device is received; and an update unit that updates the current time information output by the time output unit based on the first time information, the second time information stored in the storage unit, and third time information that is the current time information output from the time output unit when a signal processing unit that performs predetermined signal processing on the input signal ends the signal processing of the input signal.

Conventionally, a technology has been developed regarding time synchronization between a plurality of devices.

Vehicle-mounted devices in a vehicle-mounted network periodically calculate, according to a protocol stipulated by the IEEE (registered trademark) 802.1 standard, an average value of propagation delay times of data transmitted in two directions between vehicle-mounted devices as a logical value, and perform time synchronization with the other vehicle-mounted devices using the most recently calculated logical value of the propagation delay times, for example.

However, the propagation delay time of data transmitted in one direction between vehicle-mounted devices and the propagation delay time of data transmitted in another direction may differ, and in such a case, the actual value of a propagation delay time and the logical value of a propagation delay time differ, and thus issues such as a reduction in the accuracy of time synchronization occur.

The present disclosure has been made to solve the above-mentioned problems, and an object thereof is to provide a vehicle-mounted device, a vehicle-mounted communication system, and a time synchronization method that enable more accurate time synchronization between vehicle-mounted devices.

SUMMARY

A vehicle-mounted device according to the present disclosure includes: a storage unit configured to store delay time information including at least one of a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device; a processing unit configured to measure a propagation delay time between the own device and the other device by transmitting and receiving time synchronization information to and from the other device; a correction unit configured to correct the propagation delay time measured by the processing unit, based on the delay time information stored in the storage unit; and a time synchronization unit configured to perform time synchronization between the own device and the other device based on the corrected propagation delay time obtained by the correction unit.

A vehicle-mounted communication system according to the present disclosure includes: a first vehicle-mounted device; and a second vehicle-mounted device, wherein the first vehicle-mounted device is configured to store delay time information including at least one of a first set including a first transmission delay time from an external portion to a measurement reference position at a data reception time in the first vehicle-mounted device, and a second transmission delay time from an external portion to a measurement reference position at a data reception time in the second vehicle-mounted device, and a second set including a third transmission delay time from a measurement reference position to an external portion at a data transmission time in the first vehicle-mounted device, and a fourth transmission delay time from a measurement reference position to an external portion at a data transmission time in the second vehicle-mounted device, and the first vehicle-mounted device is further configured to measure a propagation delay time of data with the second vehicle-mounted device by transmitting and receiving time synchronization information to and from the second vehicle-mounted device, correct the measured propagation delay time based on the stored delay time information, and perform time synchronization with the second vehicle-mounted device based on the corrected propagation delay time.

A time synchronization method according to the present disclosure is a time synchronization method of a vehicle-mounted device storing delay time information including at least one of a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device, the time synchronization method includes: a step of measuring a propagation delay time between the own device and the other device by transmitting and receiving time synchronization information to and from the other device; a step of correcting the measured propagation delay time based on the stored delay time information; and a step of performing time synchronization between the own device and the other device, based on the corrected propagation delay time.

One aspect of the present disclosure can be realized not only as a vehicle-mounted device that includes such characteristic processing units, but also as a program for enabling a computer to carry out such characteristic processing. Also, one aspect of the present disclosure can be realized as a semiconductor integrated circuit that realizes a part or the entirety of the vehicle-mounted device.

One aspect of the present disclosure can be realized not only as a vehicle-mounted communication system that includes such characteristic processing units, but also as a time synchronization method for carrying out such characteristic processing as steps, or as a program for enabling a computer to carry out such steps. Also, one aspect of the present disclosure can be realized as a semiconductor integrated circuit that realizes a part or the entirety of the vehicle-mounted communication system.

According to the present disclosure, time synchronization between vehicle-mounted devices can be more accurately performed.

BRIEF DESCRIPTION OF THE DRAWINGS

FIG. 9 is a diagram showing an example of delay time information stored in a storage unit of a slave function unit according to the embodiment of the present disclosure.

DETAILED DESCRIPTION OF THE PREFERRED EMBODIMENTS

Figure 1:
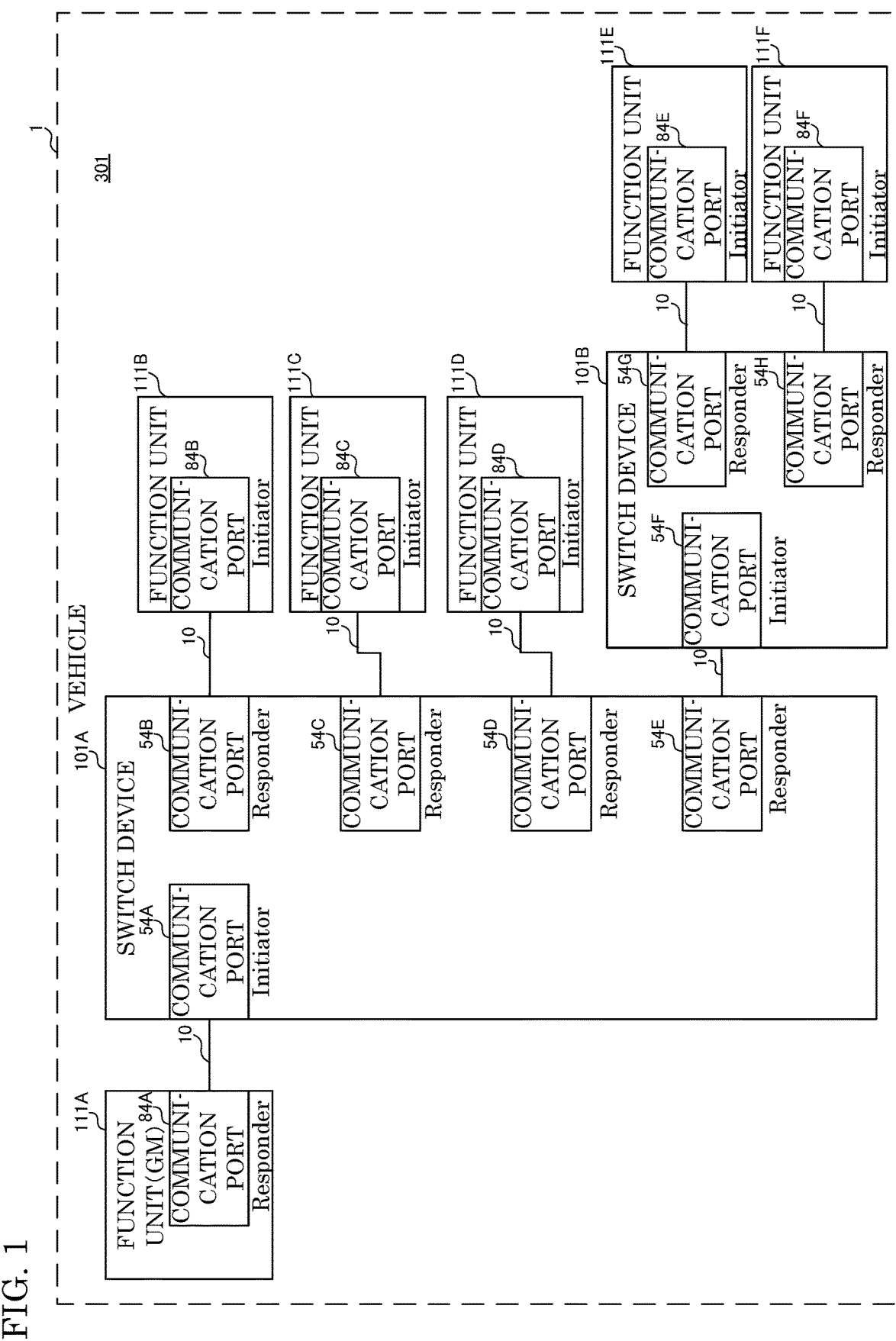
FIG. 1 is a diagram showing a configuration of a vehicle-mounted communication system according to an embodiment of the present disclosure.

First, the details of an embodiment of the present disclosure are listed and described.

A vehicle-mounted device according to an embodiment of the present disclosure includes: a storage unit configured to store delay time information including at least one of a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device; a processing unit configured to measure a propagation delay time between the own device and the other device by transmitting and receiving time synchronization information to and from the other device; a correction unit configured to correct the propagation delay time measured by the processing unit, based on the delay time information stored in the storage unit; and a time synchronization unit configured to perform time synchronization between the own device and the other device based on the corrected propagation delay time obtained by the correction unit.

In this way, by employing a configuration where the first propagation delay time and the second propagation delay time included in the first set or the third propagation delay time and the fourth propagation delay time included in the second set are used to correct the propagation delay time, even if the propagation delay time of data transmitted in one direction between vehicle-mounted devices and the propagation delay time of data transmitted in the other direction differ, it is possible to calculate a more accurate propagation delay time. Thus, time synchronization between vehicle-mounted devices can be more accurately performed.

A configuration is possible in which the delay time information includes both the first set and the second set.

By employing such a configuration, the propagation delay time can be corrected using transmission delay times of both data transmission and data reception, and thus an even more accurate propagation delay time can be calculated.

A configuration is possible in which each of the measurement reference positions is located between a MAC (Medium Access Control) processing unit that performs MAC layer processing and a PHY (Physical) processing unit that performs PHY layer processing.

By employing such a configuration, more suitable correction of the propagation delay time can be performed by giving consideration to the time required to perform PHY processing on data at the time the data is transmitted or received by the vehicle-mounted devices.

A configuration is possible in which the vehicle-mounted device further includes a relay unit capable of relaying data at three or more communication ports, wherein pieces of the delay time information are in one-to-one correspondence with the communication ports, and the storage unit stores a piece of the delay time information corresponding to a portion of the communication ports among the three or more communication ports. Here, out of two vehicle-mounted devices, it is sufficient that one of the vehicle-mounted devices performs time correction based on the propagation delay time, and it is sufficient that the one vehicle-mounted device holds delay time information. As described device, by using a configuration where each vehicle-mounted device holds delay time information in correspondence with a portion of the communication ports among the three or more communication ports, a configuration can be employed where, for example, when one vehicle-mounted device transmits or receives data using a communication port that corresponds to the held delay time, the one vehicle-mounted device performs time correction with a communication partner, whereas when the one vehicle-mounted device transmits or receives data using another communication port, the communication partner performs time correction with the one vehicle-mounted device, and thus a vehicle-mounted network having a function of performing time correction can be more efficiently realized.

A vehicle-mounted communication system according to an embodiment of the present disclosure includes: a first vehicle-mounted device; and a second vehicle-mounted device, wherein the first vehicle-mounted device is configured to store delay time information including at least one of a first set including a first transmission delay time from an external portion to a measurement reference position at a data reception time in the first vehicle-mounted device, and a second transmission delay time from an external portion to a measurement reference position at a data reception time in the second vehicle-mounted device, and a second set including a third transmission delay time from a measurement reference position to an external portion at a data transmission time in the first vehicle-mounted device, and a fourth transmission delay time from a measurement reference position to an external portion at a data transmission time in the second vehicle-mounted device, and the first vehicle-mounted device is further configured to measure a propagation delay time of data with the second vehicle-mounted device by transmitting and receiving time synchronization information to and from the second vehicle-mounted device, correct the measured propagation delay time based on the stored delay time information, and perform time synchronization with the second vehicle-mounted device based on the corrected propagation delay time.

In this way, by employing a configuration where the first propagation delay time and the second propagation delay time included in the first set or the third propagation delay time and the fourth propagation delay time included in the second set are used to correct the propagation delay time, even if the propagation delay time of data transmitted in one direction between vehicle-mounted devices and the propagation delay time of data transmitted in the other direction differ, it is possible to calculate a more accurate propagation delay time. Thus, time synchronization between vehicle-mounted devices can be more accurately performed.

A time synchronization method according to an embodiment of the present disclosure is a time synchronization method of a vehicle-mounted device storing delay time information including at least one of a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device, the time synchronization method includes: a step of measuring a propagation delay time between the own device and the other device by transmitting and receiving time synchronization information to and from the other device; a step of correcting the measured propagation delay time based on the stored delay time information; and a step of performing time synchronization between the own device and the other device, based on the corrected propagation delay time.

In this way, by employing a method where the first propagation delay time and the second propagation delay time included in the first set or the third propagation delay time and the fourth propagation delay time included in the second set are used to correct the propagation delay time, even if the propagation delay time of data transmitted in one direction between vehicle-mounted devices and the propagation delay time of data transmitted in the other direction differ, it is possible to calculate a more accurate propagation delay time. Thus, time synchronization between vehicle-mounted devices can be more accurately performed.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation

Overall Configuration

FIG. 1 is a diagram showing a configuration of a vehicle-mounted communication system according to an embodiment of the present disclosure. As shown in FIG. 1, a vehicle-mounted communication system 301 is mounted in a vehicle 1 and includes one or more switch devices 101 and a plurality of function units 111. In FIG. 1, as an example, two switch devices 101A and 101B, which are the switch devices 101, and six function units 111A, 111B, 111C, 111D, 111E, and 111F, which are the function units 111, are shown. The switch devices 101 and the function units 111 are vehicle-mounted devices and are ECUs (Electronic Control Units), for example.

The switch devices 101 are connected to a plurality of vehicle-mounted devices via Ethernet (registered trademark) cables 10, for example, and are capable of communicating with the vehicle-mounted devices connected thereto.

In the example shown in FIG. 1, the function units 111A, 111B, 111C, and 111D and the switch device 101B are connected to the switch device 101A. Also, the function units 111E and 111F are connected to the switch device 101B.

For example, the switch devices 101 perform relay processing for relaying data from one function unit 111 to another function unit 111. For example, information is transmitted and received between vehicle-mounted devices using Ethernet frames in which IP packets are stored.

The function units 111 are external communication ECUs, sensors, cameras, navigation devices, automatic driving processing ECUs, ADAS (Advanced Driving Assistant System) ECUs, engine control devices, AT (Automatic Transmission) control devices, HEV (Hybrid Electric Vehicle) control devices, brake control devices, chassis control devices, steering control devices, instrument display control devices, and the like.

Switch Device and Master Function Unit
Configuration of Switch Device

Figure 2:
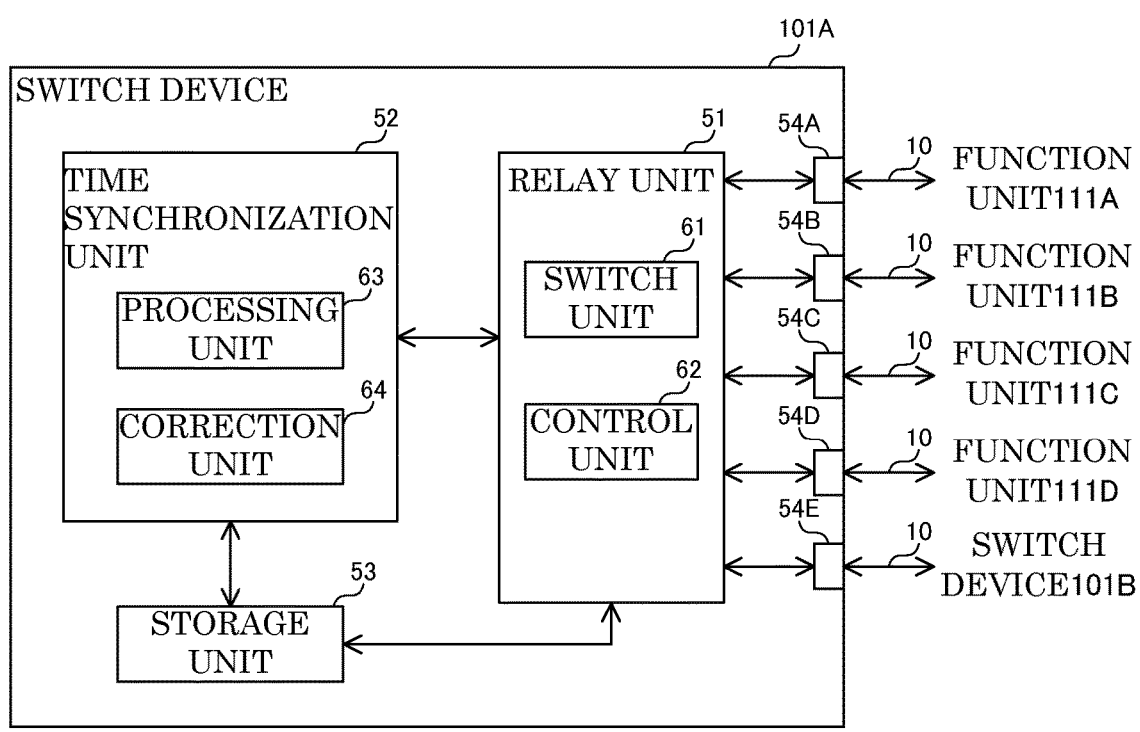
FIG. 2 is a diagram showing a configuration of a switch device according to an embodiment of the present disclosure.

FIG. 2 is a diagram showing a configuration of a switch device according to an embodiment of the present disclosure. Here, the configuration of the switch device 101A will be described. The configuration of the switch device 101B is similar to the configuration of the switch device 101A.

As shown in FIG. 2, the switch device 101A includes a relay unit 51, a time synchronization unit 52, a storage unit 53, and communication ports 54A to 54E. The relay unit 51 and the time synchronization unit 52 are realized by processors such as a CPU (Central Processing Unit) or a DSP (Digital Signal Processor), for example. The storage unit 53 is, for example, a non-volatile memory.

The relay unit 51 includes a switch unit 61 and a control unit 62. The time synchronization unit 52 includes a processing unit 63 and a correction unit 64. Below, the communication ports 54A to 54E may also simply be referred to as "communication ports 54".

Relay Processing Performed by Switch Device

The communication ports 54 correspond to input and output ends of the switch device 101A and are terminals to which the Ethernet cables 10 can be connected, for example. Note that the communication ports 54 may also be terminals of integrated circuits. Each of the communication ports 54 is connected to any one of the vehicle-mounted devices via an Ethernet cable 10. In this example, the communication port 54A is connected to the function unit 111A, the communication port 54B is connected to the function unit 111B, the communication port 54C is connected to the function unit 111C, the communication port 54D is connected to the function unit 111D, and the communication port 54E is connected to the switch device 101B.

The storage unit 53 stores an address table At showing the correspondence relationship between the port numbers of the communication ports 54 and the MAC (Media Access Control) addresses of the connection destination devices.

The switch unit 61 relays data between other vehicle-mounted devices by using the communication ports 54A to 54E. That is, upon receiving an Ethernet frame transmitted from another vehicle-mounted device via the communication port 54 corresponding to that vehicle-mounted device, the switch unit 61 performs relay processing on the received Ethernet frame.

More specifically, the switch unit 61 references the address table At stored in the storage unit 53 and specifies the port number corresponding to the transmission destination MAC address included in the received Ethernet frame. The switch unit 61 then transmits the received Ethernet frame from the communication port 54 with the specified port number.

Configuration of Master Function Unit

Figure 3:
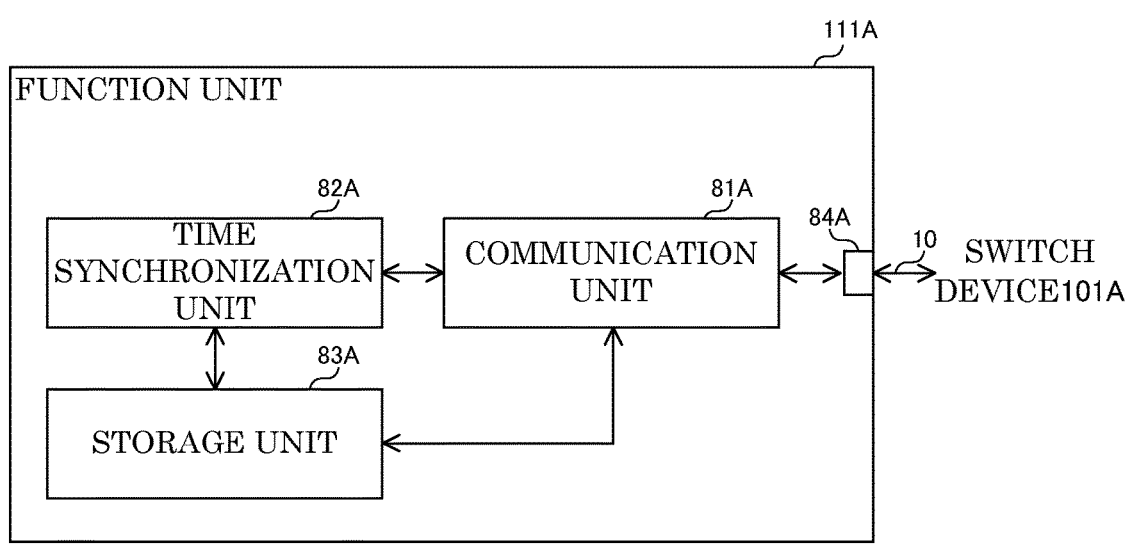
FIG. 3 is a diagram showing a configuration of a master function unit according to the embodiment of the present disclosure.

FIG. 3 is a diagram showing a configuration of a master function unit according to the embodiment of the present disclosure. Assume that the function unit 111A among the function units 111A to 111F shown in FIG. 1 is the master function unit 111 that holds the reference time in the vehicle-mounted communication system 301. Also, assume that the other function units 111B to 111F are slave function units 111.

As shown in FIG. 3, the master function unit 111A includes a communication unit 81A, a time synchronization unit 82A, a storage unit 83A, and a communication port 84A. The communication unit 81A and the time synchronization unit 82A are realized by processors such as a CPU or a DSP, for example. The storage unit 83A is, for example, a non-volatile memory.

The communication port 84A corresponds to an input end and an output end of the function unit 111A and is a terminal to which an Ethernet cable 10 can be connected, for example. Note that the communication port 84A may also be a terminal of an integrated circuit or the like. The communication port 84A is connected to the switch device 101A via the Ethernet cable 10.

Figure 4:
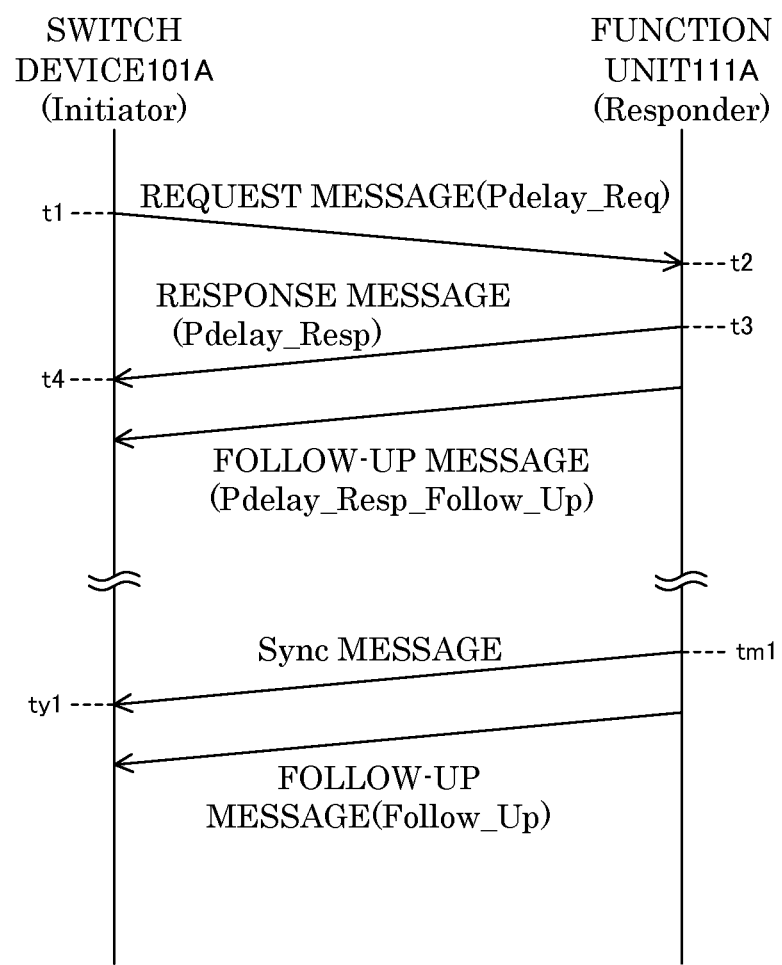
FIG. 4 is a diagram for illustrating a method for calculating a propagation delay time of data between a switch device and a master function unit, which is performed by the switch device according to the embodiment of the present disclosure.

Calculation of Propagation Delay Time of Data Between Master Function Unit and Switch Device FIG. 4 is a diagram for illustrating a method for calculating a propagation delay time of data between a switch device and a master function unit, which is performed by the switch device according to the embodiment of the present disclosure.

As shown in FIGS. 2 to 4, the switch device 101A, for example, measures the propagation delay time of data between the function unit 111A and the switch device 101A by transmitting and receiving time synchronization information to and from the master function unit 111A according to the IEEE 802.1 standard. The switch device 101A performs time synchronization with the function unit 111A based on the thus measured propagation delay time.

Out of two vehicle-mounted devices, the device that performs time correction that is based on a propagation delay time will also be referred to as the "initiator" while the other device will also be referred to as the "responder". Here, out of the switch device 101A and the function unit 111A, the switch device 101A is the initiator and the function unit 111A is the responder.

Specifically, the switch device 101A periodically or irregularly calculates a propagation delay time Td1 of data transmitted between the function unit 111A and the switch device 101A, and updates the already held propagation delay time Td1 to the newly calculated propagation delay time Td1.

More specifically, the processing unit 63 of the switch device 101A transmits request information (Pdelay_Req) for requesting time information used to update the propagation delay time Td1 to the function unit 111A via the relay unit 51 and the communication port 54A. Hereinafter, the request information is also referred to as a "request message". Also, the control unit 62 of the relay unit 51 stores a transmission time t1 of the request message as a time stamp in the storage unit 53.

The communication unit 81A of the function unit 111A receives the request message transmitted from the switch device 101A, via the communication port 84A, and outputs the received request message to the time synchronization unit 82A. Also, the communication unit 81A stores a reception time t2 of the request message as a time stamp in the storage unit 83A.

The time synchronization unit 82A receives the request message from the communication unit 81A and outputs time information (Pdelay_Resp) to the communication unit 81A in response to the request message. The communication unit 81A transmits the time information received from the time synchronization unit 82A to the switch device 101A, via the communication port 84A. At this time, the time synchronization unit 82A transmits time information including the reception time t2 of the request message stored in the storage unit 83A. Hereinafter, the time information is also referred to as a "response message". Also, the communication unit 81A stores a transmission time t3 of the response message as a time stamp in the storage unit 83A.

After the response message has been transmitted, the time synchronization unit 82A outputs a follow-up message (Pdelay_Resp_Follow_Up) including the transmission time t3 of the response message stored in the storage unit 83A to the communication unit 81A. The communication unit 81A transmits the follow-up message received from the time synchronization unit 82A to the switch device 101A, via the communication port 84A.

The control unit 62 of the switch device 101A receives the response message and follow-up message transmitted from the function unit 111A, via the communication port 54A. Then, the control unit 62 stores a reception time t4 of the response message as a time stamp in the storage unit 53. Also, the control unit 62 notifies the time synchronization unit 52 of the time t2 included in the response message and the time t3 included in the follow-up message.

The processing unit 63 of the time synchronization unit 52 calculates the propagation delay time Td1 of data transmitted between the function unit 111A and the switch device 101A based on the times t2 and t3 notified by the control unit 62 and the times t1 and t4 stored in the storage unit 53. More specifically, the processing unit 63 calculates, as the propagation delay time Td1, the average value of the propagation delay times of data transmitted in two directions between the switch device 101A and the function unit 111A.

Specifically, the processing unit 63, using Formula (1) below, calculates the average value of the period of time from the transmission time t1 of the request message at the switch device 101A to the reception time t2 of the request message at the function unit 111A and the period of time from the transmission time t3 of the response message at the function unit 111A to the reception time t4 of the response message at the switch device 101A, as the propagation delay time Td1. Then, the processing unit 63 updates the propagation delay time Td1 stored in the storage unit 53 to the newly calculated propagation delay time Td1.

$$Td1 = ((t4 - t1) - (t3 - t2))/2 \quad (1)$$

Correction of Time in Switch Device

The time synchronization unit 82A in the function unit 111A periodically or irregularly outputs a Sync message to the communication unit 81A. The communication unit 81A transmits the Sync message received from the time synchronization unit 82A to the switch device 101A, via the communication port 84A. Here, the communication unit 81A stores a transmission time tm1 of the Sync message as a time stamp in the storage unit 83A.

Also, after the Sync message has been transmitted, the time synchronization unit 82A outputs a follow-up message (Follow_Up) including the transmission time tm1 stored in the storage unit 83A to the communication unit 81A. The communication unit 81A transmits the follow-up message received from the time synchronization unit 82A to the switch device 101A, via the communication port 84A.

The control unit 62 of the switch device 101A receives the Sync message and the follow-up message transmitted from the function unit 111A, via the communication port 54A. The control unit 62 stores a reception time ty1 of the Sync message as a time stamp in the storage unit 53. Also, the control unit 62 notifies the time synchronization unit 52 of the time tm1 included in the follow-up message.

The processing unit 63 of the time synchronization unit 52 performs time synchronization with the function unit 111A based on the time tm1 notified by the control unit 62, the time ty1 stored in the storage unit 53, and the propagation delay time Td1.

Here, assume the processing unit 63 calculates a time difference D1=tm1+Td1−ty1, which is the difference between the time of the function unit 111A and the time of the switch device 101, using the times tm1 and ty1 and the propagation delay time Td1. Then, the processing unit 63 realizes time synchronization with the function unit 111A by using the calculated time difference D1 to correct the time of the own switch device 101A.

Incidentally, in the switch device 101A and the function unit 111A that are vehicle-mounted devices, when data is transmitted or received, an IC (Integrated Circuit) chip that performs PHY (Physical) layer processing such as A/D conversion, or an IC chip that performs MAC layer processing, such as processing of a MAC address stored in an Ethernet frame, stores the transmission time or the reception time as a time stamp with respect to the data. The position that serves as a reference for time stamp measurement is also simply referred to as the "measurement reference position" below.

The transmission delay time of data between a measurement reference position of a vehicle-mounted device and an external portion outside the vehicle-mounted device may differ according to the vendor and type of the vehicle-mounted device. This will be described below in detail using the drawings.

Transmitting Data From Initiator to Responder

Figure 5:
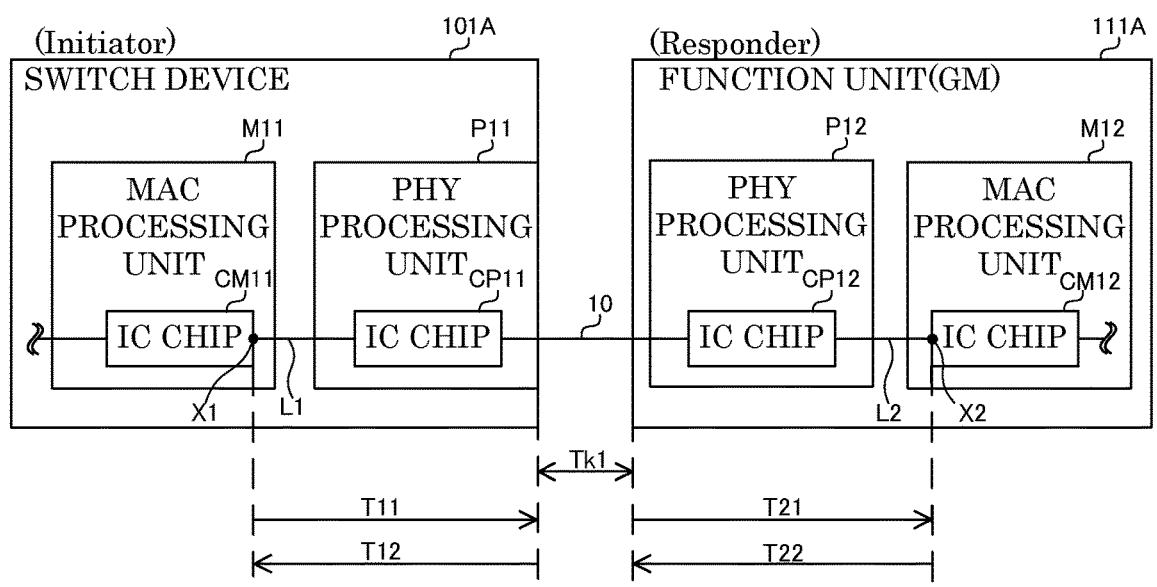
FIG. 5 is a diagram for describing data transmission delay times of both a switch device and a master function unit according to the embodiment of the present disclosure.

FIG. 5 is a diagram for describing data transmission delay times of both a switch device and a master function unit according to the embodiment of the present disclosure.

As shown in FIG. 5, the switch device 101A, which is the initiator, includes a MAC processing unit M11 and a PHY processing unit P11 that correspond to the communication port 54A. The MAC processing unit M11 includes an IC chip CM11 that performs MAC layer processing. The PHY processing unit P11 includes an IC chip CP11 that performs PHY layer processing. The IC chip CM11 also performs at least one function of the control unit 62 shown in FIG. 2, for example.

Assume that a measurement reference position X1 corresponding to the communication port 54A of the switch device 101A is located between the IC chip CM11 and the IC chip CP11, specifically, near the boundary between a data transmission path L1 of a wire of a printed board or the like and the IC chip CM11 in the region between the IC chip CM11 and the IC chip CP11.

Also, the function unit 111A, which is the responder, includes a MAC processing unit M12 and a PHY processing unit P12. The MAC processing unit M12 includes an IC chip CM12 that performs MAC layer processing. The PHY processing unit P12 includes an IC chip CP12 that performs PHY layer processing. The IC chip CM12 also performs at least one function of the communication unit 81A shown in FIG. 3, for example.

Assume that a measurement reference position X2 of the function unit 111A is located between the IC chip CM12 and the IC chip CP12, specifically, near the boundary between a data transmission path L2 of a wire of a printed board or the like and the IC chip CM12 in the region between the IC chip CM12 and the IC chip CP12.

When the switch device 101A transmits data to the function unit 111A, the IC chip CM11 stores the time at which the data passes the measurement reference position X1, that is the transmission time at which the data is output to the IC chip CP11, as a time stamp in the storage unit 53. Then, the IC chip CP11 performs PHY layer processing on the data received from the IC chip CM11, and outputs the resulting data to an external portion outside the switch device 101A via the communication port 54A. The transmission delay time from when the IC chip CM11 stores the data transmission time to when the data is output to an external portion outside the switch device 101A, that is up to when data is output from the output end of the switch device 101A is "T11".

When the function unit 111A receives data from the switch device 101A, the IC chip CP12 performs PHY layer processing on the data received from the external portion via the communication port 84A, and outputs the resulting data to the IC chip CM12. The IC chip CM12 stores the time at which the data from the IC chip CP12 passes the measurement reference position X2, that is the reception time at which the data was received from the IC chip CP12, as a time stamp in the storage unit 83A. The transmission delay time from when the data from the external portion is received at the input end of the function unit 111A to when the IC chip CM12 stores the data reception time is "T21".

Transmitting Data from Responder to Initiator

When the function unit 111A transmits data to the switch device 101A, the IC chip CM12 stores the time at which the data passes the measurement reference position X2, that is the transmission time at which the data is output to the IC chip CP12, as a time stamp in the storage unit 83A. Then, the IC chip CP12 performs PHY layer processing on the data received from the IC chip CM12, and outputs the resulting data to an external portion outside the function unit 111A via the communication port 84A. The transmission delay time from when the IC chip CM12 stores the data transmission time to when the data is output to the external portion outside the function unit 111A, that is up to when data is output from the output end of the function unit 111A is "T22".

When the switch device 101A receives data from the function unit 111A, the IC chip CP11 performs PHY layer processing on the data received from the external portion via the communication port 54A, and outputs the resulting data to the IC chip CM11. The IC chip CM11 stores the time at which the data from the IC chip CP11 passes the measurement reference position X1, that is the reception time at which the data is received from the IC chip CP11, as a time stamp in the storage unit 53. The transmission delay time from when the data from the external portion is received at the input end of the switch device 101A to when the IC chip CM11 stores the data reception time is "T12".

Note that, in the switch device 101A, the IC chip CM11 is configured to store the transmission time or reception time of data, but the present disclosure is not limited to this configuration, and the IC chip CP11 may be configured to store the transmission time or reception time of data. In this case, the measurement reference position X1 is located near the boundary between the IC chip CP11 and the Ethernet cable 10.

Also, in the function unit 111A, the IC chip CM12 is configured to store the transmission time or reception time of data, but the present disclosure is not limited to this configuration, and the IC chip CP12 may be configured to store the transmission time or the reception time of data. In this case, the measurement reference position X2 is located near the boundary between the IC chip CP12 and the Ethernet cable 10.

Regarding Relation Between Logical Value of Transmission Delay Time Td1, and Transmission Delay Time in Consideration of Measurement Reference Position The propagation time required for data to pass through an Ethernet cable 10 between the function unit 111A and the switch device 101A is Tk1. In this case, the time period from the data transmission time at the switch device 101A to the data reception time at the function unit 111A, that is a propagation delay time Ttx of data from the switch device 101A to the function unit 111A that takes into account the transmission delay time of data between the measurement reference positions X1 and X2 of the devices and external portions is expressed as the following Formula (2).

$$Ttx = T11 + Tk1 + T21 \quad (2)$$

Also, the time period from the data transmission time at the function unit 111A to the data reception time at the switch device 101A, that is a propagation delay time Ttr of data from the function unit 111A to the switch device 101A that takes into account the transmission delay time of data between the measurement reference positions X1 and X2 of the devices and external portions is expressed as the following Formula (3).

$$Ttr = T22 + Tk1 + T12 \quad (3)$$

As described using FIG. 4, the processing unit 63 of the switch device 101A calculates the average value of propagation delay times of data transmitted in two directions between the switch device 101A and the function unit 111A as a logical value of the propagation delay time Td1 of data transmitted between the function unit 111A and the switch device 101A.

In other words, using the aforementioned times T11, T12, T21, T22, and Tk1 in place of the times t1, t2, t3, and t4 shown in FIG. 4, the logical value of the propagation delay time Td1 calculated by the processing unit 63 is expressed using the following Formula (4).

$$Td1 = (Ttx + Ttr)/2 = \{(T11 + Tk1 + T21) + (T22 + Tk1 + T12)\}/2 \quad (4)$$

Here, the transmission delay time of data between a measurement reference position of a vehicle-mounted device and an external portion outside the vehicle-mounted device may vary according to the vendor, type, and the like of the vehicle-mounted device. Specifically, the transmission delay times T11, T12, T21, and T22 shown in FIG. 5 may vary according to the vendor or the like of the switch device 101A and the function unit 111A.

In such a case, the propagation delay times Ttx and Ttr of data transmitted in two directions between the switch device 101A and the function unit 111A are of different magnitudes (Ttx≠Ttr), and the propagation delay times Ttx and Ttr are of a magnitude different from the logical value of the propagation delay time Td1 (Td1≠Ttx, Td1≠Ttr) that is the average value of the propagation delay times Ttx and Ttr. In contrast to this, the vehicle-mounted devices of the vehicle-mounted communication system 301 according to the embodiment of the present disclosure employ the following configurations in order to be able to more accurately calculate a propagation delay time.
Holding of Transmission Time Table and Correction of Propagation Delay Time in Switch Device
Holding of Transmission Time Table FIG. 6 is a diagram showing an example of delay time information stored in the storage unit of the switch device according to the embodiment of the present disclosure.

Figure 6:
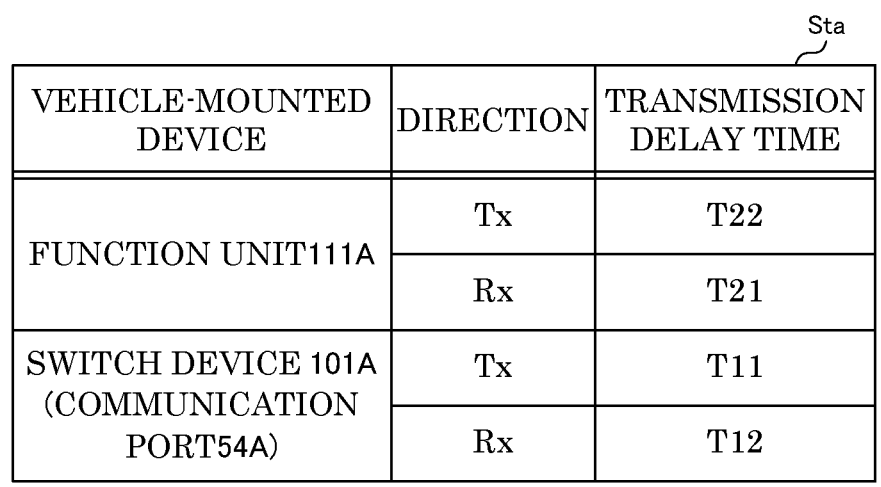
FIG. 6 is a diagram showing an example of delay time information stored in the storage unit of the switch device according to the embodiment of the present disclosure.

In reference to FIGS. 2 and 6, the storage unit 53 of the switch device 101A stores a table Sta showing delay time information including the aforementioned transmission delay times T11 and T12 when the switch device 101A is the initiator, and the aforementioned transmission delay times T21 and T22 when the function unit 111A is the responder.

That is, the delay time information includes the transmission delay time (third transmission delay time) T11 of data from the measurement reference position X1 of the switch device 101A to an external portion, that is to the output end of the switch device 101A, the transmission delay time (first transmission time) T12 of data from an external portion outside the switch device 101A, that is from the input end of the switch device 101A to the measurement reference position X1 of the switch device 101A, the transmission delay time (second transmission delay time) T21 of data from the external portion outside the function unit 111A, that is from the input end of the function unit 111A to the measurement reference position X2 of the function unit 111A, and the transmission delay time (fourth transmission delay time) T22 from the measurement reference position X2 of the function unit 111A to an external portion, that is to the output end of the function unit 111A.

Note that, in the vehicle-mounted communication system 301 shown in FIG. 1, regarding the function unit 111B and the switch device 101A, the function unit 111B is the initiator and the switch device 101A is the responder. Also, regarding the function unit 111C and the switch device 101A, the function unit 111C is the initiator and the switch device 101A is the responder. Regarding the function unit 111D and the switch device 101A, the function unit 111D is the initiator and the switch device 101A is the responder.

Also, regarding the switch device 101B and the switch device 101A, the switch device 101B is the initiator and the switch device 101A is the responder. Regarding the function unit 111E and the switch device 101B, the function unit 111E is the initiator and the switch device 101B is the responder. Regarding the function unit 111F and the switch device 101B, the function unit 111F is the initiator and the switch device 101B is the responder.

In this way, the switch device 101A is the initiator in data transmission and reception with the function unit 111A via the communication port 54A. The switch device 101A is the responder in data transmission and reception with the function units 111B to 111D via the respective communication ports 54B to 54D, and in data transmission and reception with the switch device 101B via the communication port 54E. The table Sta shown in FIG. 6 shows, of the five communication ports 54A to 54E of the switch device 101A, the delay time information of the communication port 54A used when the switch device 101A is the initiator, in other words, the delay time information regarding data transmission and reception via the communication port 54A.

Propagation Delay Time Td1 Correction

The correction unit 64 of the switch device 101A, for example, references the delay time information shown in the table Sta stored in the storage unit 53 to correct the propagation delay time Td1 calculated by the processing unit 63.

More specifically, as expressed in Formula (5) below, the value obtained by subtracting a correction value Cv from the propagation delay time Td1 is the propagation delay time Ttx for when a message is transmitted from the switch device 101A to the function unit 111A. Also, as expressed in Formula (6) below, the value obtained by adding the correction value Cv to the propagation delay time Td1 is the propagation delay time Ttr for when a message is transmitted from the function unit 111A to the switch device 101A.

$$Ttx = Td1 - Cv \qquad (5)$$

$$Ttr = Td1 + Cv \qquad (6)$$

In this case, the correction value Cv is indicated using the following Formula (7).

$$\begin{aligned} Cv &= Td1 - Ttx \\ &= \{(T11 + Tk1 + T21) + (T22 + Tk1 + T12)\}/2 - (T11 + Tk1 + T21) \\ &= \{(T22 - T11) + (T12 - T21)\}/2 \end{aligned} \qquad (7)$$

The correction unit 64 calculates, for example, the correction value Cv using the Formula (7), and subtracts the correction value Cv from the propagation delay time Td1 in order to correct the propagation delay time Td1. Then, the correction unit 64 notifies the processing unit 63 of the propagation delay time Ttx that is the corrected propagation delay time (Td1−Cv) as being the propagation delay time of transmitting data to the function unit 111A.

Also, the correction unit 64 adds the correction value Cv to the propagation delay time Td1 in order to correct the propagation delay time Td1. Then, the correction unit 64 notifies the processing unit 63 of the propagation delay time Ttr, which is the corrected propagation delay time (Td1+Cv), as being the propagation delay time of receiving data from the function unit 111A.

The processing unit 63 stores the propagation delay times Ttx and Ttr notified by the correction unit 64 in the storage unit 53. The processing unit 63 also uses the propagation delay time Ttr stored in the storage unit 53, in addition to the transmission time tm1 of the Sync message notified by the control unit 62 at the function unit 111A and the reception time ty1 of the Sync message stored in the storage unit 53, which are shown in FIG. 4, to calculate a time difference D1 between the time of the function unit 111A and the time of the switch device 101A.

Specifically, the processing unit 63 calculates the time difference D1=tm1+Ttr−ty1. As a result of the processing unit 63 using the calculated time difference D1 to correct the time of the own switch device 101A, time synchronization with the function unit 111A is realized.

Note that, instead of the propagation delay time Ttr, the processing unit 63 may use the propagation delay time Ttx to perform time synchronization. For example, the processing unit 63 may use the transmission time of a message transmitted from the switch device 101A to the function unit 111A at the switch device 101A, a reception time of the message at the function unit 111A, and the propagation delay time Ttx stored in the storage unit 53 to calculate the time difference D1 between the time of the function unit 111A and the time of the switch device 101A.

Also, the delay time information is not limited to a configuration including the transmission delay times T11, T12, T21, and T22. For example, the delay time information may include a first set including transmission delay times T12 and T21 at which the switch device 101A and the function unit 111A respectively receive data, and not include a second set including transmission delay times T11 and T22 at which the switch device 101A and the function unit 111A respectively transmit data. Also, for example, the delay time information may include the second set and not include the first set.

Here, it is often the case that the transmission delay time when a vehicle-mounted device receives data is longer than the transmission delay time when the vehicle-mounted device transmits data. That is, there are cases where the transmission delay times T12 and T21 of the first set have a greater influence on the length of the propagation delay time than the transmission delay times T11 and T22 of the second set. In this case, the delay time information is preferably constituted by the first set.

Slave Function Unit

Figure 7:
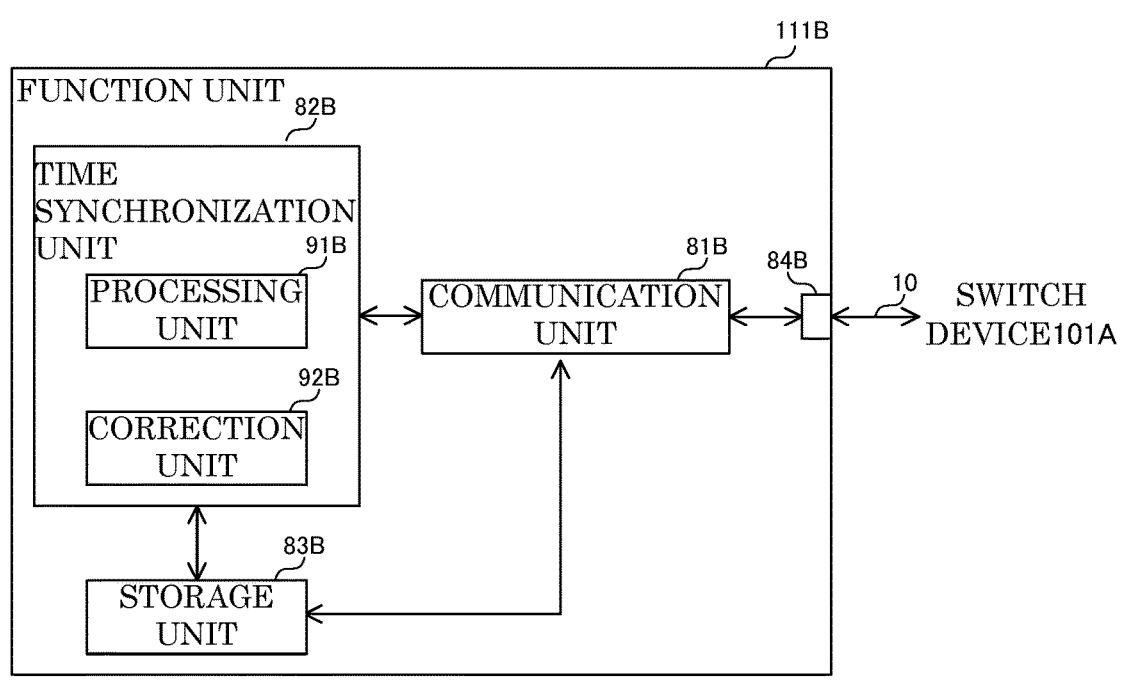
FIG. 7 is a diagram showing a configuration of a slave function unit according to the embodiment of the present disclosure.

FIG. 7 is a diagram showing a configuration of a slave function unit according to the embodiment of the present disclosure. Here, the configuration of the function unit 111B will be described. The configurations of the function units 111C to 111F are similar to the configuration of the function unit 111B.

As shown in FIG. 7, the slave function unit 111B includes a communication unit 81B, a time synchronization unit 82B, a storage unit 83B, and a communication port 84B. The communication unit 81B and the time synchronization unit 82B are realized by processors such as a CPU or a DSP, for example. The storage unit 83B is, for example, a non-volatile memory.

The time synchronization unit 82B includes a processing unit 91B and a correction unit 92B. The communication port 84B corresponds to an input end and an output end of the function unit 111B and is, for example, a terminal to which an Ethernet cable 10 can be connected. Note that the communication port 84B may also be a terminal of an integrated circuit or the like. The communication port 84B is connected via the Ethernet cable 10 to the switch device 101A.

Calculation of Propagation Delay Time of Data Between Switch Device and Slave Function Unit The function unit 111B measures a propagation delay time Td2 of data between the switch device 101A and the function unit 111B.

More specifically, the processing unit 91B of the function unit 111B periodically or irregularly calculates the propagation delay time Td2 of data between the switch device 101A and the function unit 111B, and updates the propagation delay time Td2 stored in the storage unit 83B to the newly calculated propagation delay time Td2. The method for calculating the propagation delay time Td2 performed by the processing unit 91B is similar to the method for calculating the propagation delay time Td1 performed by the processing unit 63 of the switch device 101A described using FIG. 4.

Figure 8:
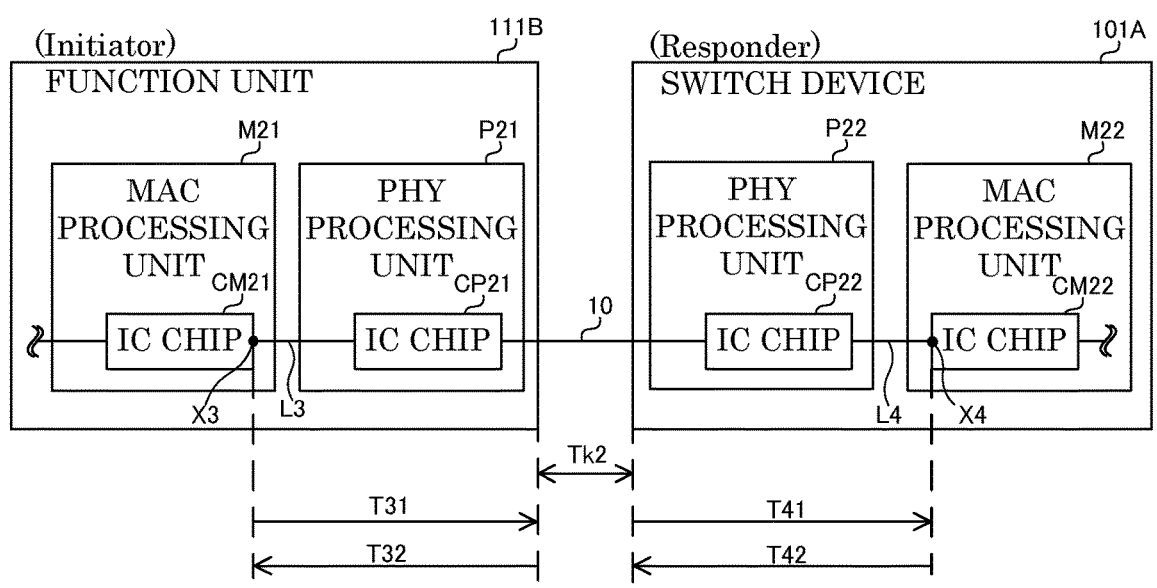
FIG. 8 is a diagram for describing data transmission delay times of a slave function unit and a switch device according to the embodiment of the present disclosure.

Transmission Delay Time of Data Between Slave Function Unit and Switch Device (a) Transmitting Data from Initiator to Responder FIG. 8 is a diagram for describing data transmission delay times of a slave function unit and a switch device according to the embodiment of the present disclosure.

As shown in FIG. 8, the function unit 111B, which is the initiator, includes a MAC processing unit M21 and a PHY processing unit P21. The MAC processing unit M21 includes an IC chip CM21 that performs MAC layer processing. The PHY processing unit P21 includes an IC chip CP21 that performs PHY layer processing. The IC chip CM21 also performs at least one function of the communication unit 81B shown in FIG. 7, for example.

Assume that a measurement reference position X3 of the function unit 111B is located between the IC chip CM21 and the IC chip CP21, specifically, near the boundary between a data transmission path L3 of a wire of a printed board or the like and the IC chip CM21 in the region between the IC chip CM21 and the IC chip CP21.

Also, the switch device 101A, which is the responder, includes a MAC processing unit M22 and a PHY processing unit P22 that correspond) to the communication port 54B. The MAC processing unit M22 includes an IC chip CM22 that performs MAC layer processing. The PHY processing unit P22 includes an IC chip CP22 that performs PHY layer processing. The IC chip CM22 also performs at least one function of the control unit 62 shown in FIG. 2, for example.

Assume that a measurement reference position X4 corresponding to the communication port 54B of the switch device 101A is located between the IC chip CM22 and the IC chip CP22, specifically, near the boundary between a data transmission path L4 of a wire of a printed board or the like and the IC chip CM22 in the region between the IC chip CM22 and the IC chip CP22.

When the function unit 111B transmits data to the switch device 101A, the IC chip CM21 stores the time at which the data passes the measurement reference position X3, that is the transmission time at which the data is output to the IC chip CP21, as a time stamp in the storage unit 83B. Then, the IC chip CP21 performs PHY layer processing on the data received from the IC chip CM21, and outputs the resulting data to an external portion outside the functional unit 111B via the communication port 84B. The propagation delay time from when the IC chip CM21 stores the data transmission time to when the data is output to the external portion outside the function unit 111B, that is the period of time up until the data is output from the output end of the function unit 111B is "T31".

When the switch device 101A receives the data from the function unit 111B, the IC chip CP22 performs PHY layer processing on the data received from the external portion via the communication port 54B, and outputs the resulting data to the IC chip CM22. The IC chip CM 22 stores the time at which the data from the IC chip CP 22 passed the measurement reference position X4, that is the reception time at which the data was received from the IC chip CP22, as a time stamp in the storage unit 53. The transmission delay time from when the data from the external portion is received at the input end of the switch device 101A to when the IC chip CM22 stores the data reception time is "T41".

(b) Transmitting Data From Responder to Initiator

When the switch device 101A transmits data to the function unit 111B, the IC chip CM22 stores the time at which the data passes the measurement reference position X4, that is the transmission time at which the data is output to the IC chip CP22, as a time stamp in the storage unit 53. Then, the IC chip CP22 performs PHY layer processing on the data received from the IC chip CM22, and outputs the data to an external portion outside the switch device 101A via the communication port 54B. The propagation delay time from when the IC chip CM22 stores the data transmission time to when the data is output to the external portion outside the switch device 101A, that is the period of time up until the data is output from the output end of the switch device 101A is "T42".

When the function unit 111B receives data from the switch device 101A, the IC chip CP21 performs PHY layer processing on the data received from the external portion via the communication port 84B, and outputs the resulting data to the IC chip CM21. The IC chip CM21 stores the time at which the data from the IC chip CP21 passes the measurement reference position X3, that is the reception time at which the data was received from the IC chip CP21, as a time stamp in the storage unit 83B. The propagation delay time from when the data from the external portion is received at the input end of the function unit 111B to when the IC chip CM21 stores the data reception time is "T32".

Holding of Transmission Time Table

FIG. 9 is a diagram showing an example of delay time information stored in a storage unit of a slave function unit according to the embodiment of the present disclosure.

As shown in FIGS. 7 to 9, the storage unit 83B of the function unit 111B stores a table Stb showing delay time information including the aforementioned transmission delay times T31 and T32 when the function unit 111B that includes the storage unit 83B is the initiator, and the aforementioned transmission delay times T41 and T42 of the switch device 101A that is the responder.

Correction of Propagation Delay Time Td2

The correction unit 92B of the function unit 111B references the delay time information shown in the table Stb stored in the storage unit 83B to correct the propagation delay time Td2 calculated by the processing unit 91B.

More specifically, the correction unit 92B calculates the correction value Cv and subtracts the correction value Cv from the propagation delay time Td2 in order to correct the propagation delay time Td2, similarly to the correction unit 64 of the switch device 101A. Then, the correction unit 92B notifies the processing unit 91B of the propagation delay time Ttx, which is the corrected propagation delay time (Td2−Cv), as being the propagation delay time for when a message is transmitted to the switch device 101A.

Also, the correction unit 92B adds the correction value Cv to the propagation delay time Td2 in order to correct the propagation delay time Td2. Then, the correction unit 64 notifies the processing unit 91B of the propagation delay time Ttr, which is the corrected propagation delay time (Td2+Cv), as being the propagation delay time of receiving a message from the switch device 101A.

The processing unit 91B stores the propagation delay times Ttx and Ttr notified by the correction unit 92B, in the storage unit 83B. The processing unit 91B also uses the propagation delay time Ttr, in addition to the transmission time tm2 of the Sync message at the switch device 101A and the reception time ty2 of the Sync message, to calculate a time difference D2 between the time of the switch device 101A and the time of the function unit 111B, for example.

Specifically, as a result of the processing unit 91B calculating the time difference D2=tm2+Ttr−ty2, and using the calculated time difference D2 to correct the time of the function unit 111B, time synchronization with the switch device 101A can be realized.

Here, if time synchronization is realized between the master function unit 111A and the switch device 101A, the time included in a follow-up message transmitted from the switch device 101A to the function unit 111B is a time synchronized with the function unit 111A. Thus, as a result of the processing unit 91B of the function unit 111B performing time correction, time synchronization between the function unit 111B and the switch device 101A is realized, and consequently, time synchronization between the function unit 111B and the function unit 111A is realized. Note that, in the vehicle-mounted communication system 301 shown in FIG. 1, at least either the initiator or the responder is the switch device 101, but the present disclosure is not limited to such a configuration. In other words, both the initiator and the responder may be a function unit 111.

Also, in the vehicle-mounted communication system 301, the master function unit 111A is not the initiator in a relation with another vehicle-mounted device, and thus does not hold delay time information. However, the function unit 111A is not limited to such a configuration, and may hold delay time information regarding the communication port 84A, for example.

Flow of Operations

Next, operations when an initiator vehicle-mounted device performs time synchronization with a responder vehicle-mounted device in the vehicle-mounted communication system 301 will be described with reference to the drawings.

The devices in the vehicle-mounted communication system 301 each have a computer that includes a memory, and in each of such devices, an arithmetic processing unit such as a CPU in the computer reads out, from the memory, a program that includes part or all of the steps of the flowchart described below, and executes the program. The programs executed by the devices can be installed from an external source. The programs executed by the devices are distributed in a state of being stored in recording media or distributed via a communication line.

Figure 10:
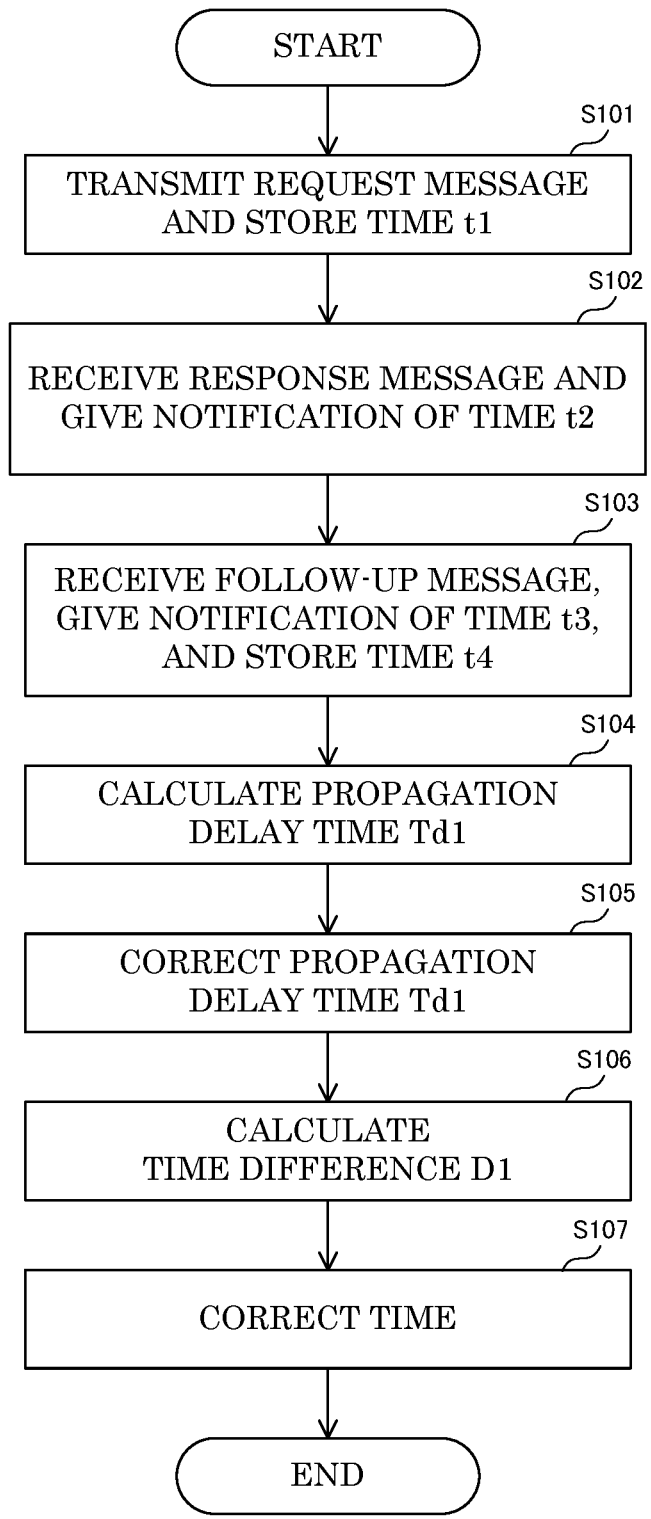
FIG. 10 is a flowchart showing an operation procedure when a vehicle-mounted device according to an embodiment of the present disclosure performs time synchronization with another vehicle-mounted device.

FIG. 10 is a flowchart showing an operation procedure when a vehicle-mounted device according to an embodiment of the present disclosure performs time synchronization with another vehicle-mounted device. Here, as an example, an operation procedure when the switch device 101A performs time synchronization with the master function unit 111A will be described.

As shown in FIG. 10, first, the processing unit 63 transmits a request message for requesting time information to the function unit 111A via the relay unit 51 and the communication port 54A. Also, the control unit 62 stores the transmission time t1 of the request message as a time stamp in the storage unit 53 (step S101).

Next, the control unit 62 receives a response message transmitted from the function unit 111A via the communication port 54A, and notifies the processing unit 63 of the reception time t2 of the request message at the function unit 111A, the reception time t2 being included in the response message (step S102).

Next, the control unit 62 receives a follow-up message transmitted from the function unit 111A via the communication port 54A, and notifies the processing unit 63 of the transmission time t3 of the response message at the function unit 111A, the transmission time t3 being included in the follow-up message. Also, the control unit 62 stores the reception time t4 of the response message as a time stamp in the storage unit 53 (step S103).

Next, the processing unit 63 calculates the propagation delay time Td1 of data between the function unit 111A and the switch device 101A based on the times t2 and t3 notified by the control unit 62 and the times t1 and t4 stored in the storage unit 53 (step S104).

Next, the correction unit 64 references the delay time information shown in the table Sta stored in the storage unit 53 to correct the propagation delay time Td1 calculated by the processing unit 63, and notifies the processing unit 63 of the corrected propagation delay time (step S105).

Next, the processing unit 63 calculates the time difference D1 between the time of the function unit 111A and the time of the switch device 101A, based on the corrected propagation delay time notified by the correction unit 64 (step S106). Then, the processing unit 63 uses the calculated time difference D1 to correct the time of the own switch device 101A. Thus, time synchronization between the function unit 111A and the switch device 101A is realized (step S107).

The foregoing embodiments are to be construed in all respects as illustrative and not restrictive. The scope of the present disclosure is defined by the claims rather than the description above, and is intended to include all modifications within the meaning and scope of the claims and equivalents thereof.

The description above includes the features appended below.

Supplementary Note 1

A vehicle-mounted device including:
a storage unit configured to store delay time information including at least one of
a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and
a second set including a third transmission delay time from a measurement reference position to an external portion at a data transmission time in the own device, and a fourth transmission delay time from a measurement reference position to an external portion at a data transmission time in the other device;
a processing unit configured to measure a propagation delay time between the own device and the other device by transmitting and receiving time synchronization information to and from the other device,
a correction unit configured to correct the propagation delay time measured by the processing unit based on the delay time information stored in the storage unit; and
a time synchronization unit configured to perform time synchronization between the own device and the other device, based on the corrected propagation delay time obtained by the correction unit,
wherein the processing unit measures the propagation delay time according to an IEEE 802.1 standard,
the delay time information includes both the first set and the second set, and
the correction unit calculates a correction value using a difference between the fourth transmission delay time and the third transmission delay time and a difference between the first transmission delay time and the second transmission delay time, and corrects the propagation delay time by adding the correction value to the propagation delay time or subtracting the correction value from the propagation delay time.

Supplementary Note 2

A vehicle-mounted communication system including:
a first vehicle-mounted device; and
a second vehicle-mounted device,
wherein the first vehicle-mounted device is configured to store delay time information including at least one of
a first set including a first transmission delay time from an external portion to a measurement reference position at a data reception time in the first vehicle-mounted device, and a second transmission delay time from an external portion to a measurement reference position at a data reception time in the second vehicle-mounted device, and
a second set including a third transmission delay time from a measurement reference position to an external portion at a data transmission time in the first vehicle-mounted device, and a fourth transmission delay time from a measurement reference position to an external portion at a data transmission time in the second vehicle-mounted device, and
the first vehicle-mounted device is further configured to measure a propagation delay time of data with the second vehicle-mounted device by transmitting and receiving time synchronization information to and from the second vehicle-mounted device, correct the measured propagation delay time based on the stored delay time information, and perform time synchronization with the second vehicle-mounted device based on the corrected propagation delay time,
the first vehicle-mounted device is a switch device capable of relaying data between a plurality of vehicle-mounted devices,
the second vehicle-mounted device is a master function unit that holds a reference time in the vehicle-mounted communication system including the own device and the other device,
the vehicle-mounted connection system further includes a third vehicle-mounted device connected to the first vehicle-mounted device,
the third vehicle-mounted device is configured to store at least one of
a third set including a fifth transmission delay time from an external portion to a measurement reference position at a data reception time in the third vehicle-mounted device, and a sixth transmission delay time from an external portion to a measurement reference position at a data reception time in the first vehicle mounted device, and
a fourth set including a seventh transmission delay time from a measurement reference position to an external portion at a data transmission time in the third vehicle-mounted device, and an eighth transmission delay time from a measurement reference position to an external portion at a data transmission time in the first vehicle-mounted device, and
the third vehicle-mounted device is further configured to measure a propagation delay time of data with the first vehicle-mounted device by transmitting and receiving time synchronization information to and from the first vehicle-mounted device, correct the measured propagation delay time based on the stored delay time information, and perform time synchronization with the first vehicle-mounted device based on the corrected propagation delay time.

The invention claimed is:

1. A vehicle-mounted device comprising:
a storage unit configured to store delay time information including at least one of
a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device;

a processing unit configured to measure a propagation delay time between the own device and the other device by transmitting and receiving time synchronization information to and from the other device;

a correction unit configured to correct the propagation delay time measured by the processing unit, based on the delay time information stored in the storage unit; and a time synchronization unit configured to perform time synchronization between the own device and the other device based on the corrected propagation delay time obtained by the correction unit, the vehicle-mounted device further comprising a relay unit configured to relay data at three or more communication ports, wherein pieces of the delay time information are in one-to-one correspondence with the communication ports, and the storage unit stores a piece of the delay time information corresponding to a portion of the communication ports among the three or more communication ports, and the correction unit corrects the propagation delay time measured by the processing unit, based on the delay time information corresponding to the portion of the communication ports stored in the storage unit.

2. The vehicle-mounted device according to claim 1, wherein the delay time information includes both the first set and the second set.

3. The vehicle-mounted device according to claim 1, wherein each of the measurement reference positions is located between a MAC (Medium Access Control) processing unit that performs MAC layer processing and a PHY (Physical) processing unit that performs PHY layer processing.

4. The vehicle-mounted device according to claim 2, wherein each of the measurement reference positions is located between a MAC (Medium Access Control) processing unit that performs MAC layer processing and a PHY (Physical) processing unit that performs PHY layer processing.

5. A vehicle-mounted communication system comprising:
a first vehicle-mounted device; and
a second vehicle-mounted device,
wherein the first vehicle-mounted device is configured to store delay time information including at least one of
a first set including a first transmission delay time from an external portion to a measurement reference position at a data reception time in the first vehicle-mounted device, and a second transmission delay time from an external portion to a measurement reference position at a data reception time in the second vehicle-mounted device, and
a second set including a third transmission delay time from a measurement reference position to an external portion at a data transmission time in the first vehicle-mounted device, and a fourth transmission delay time from a measurement reference position to an external portion at a data transmission time in the second vehicle-mounted device, and the first vehicle-mounted device is further configured to measure a propagation delay time of data with the second vehicle-mounted device by transmitting and receiving time synchronization information to and from the second vehicle-mounted device, correct the measured propagation delay time based on the stored delay time information, and perform time synchronization with the second vehicle-mounted device based on the corrected propagation delay time, the first vehicle-mounted device is further configured to relay data at three or more communication ports, pieces of the delay time information are in one-to-one correspondence with the communication ports, and the first vehicle-mounted device stores a piece of the delay time information corresponding to a portion of the communication ports among the three or more communication ports, and the first vehicle-mounted device corrects the measured propagation delay time based on the stored delay time information corresponding to the portion of the communication ports.

6. A time synchronization method of a vehicle-mounted device storing delay time information including at least one of a first set including a first transmission delay time from an external portion to a measurement reference position at a data reception time in an own device that is the vehicle-mounted device, and a second transmission delay time from an external portion to a measurement reference position at a data reception time in another device that is a different vehicle-mounted device, and a second set including a third transmission delay time from a measurement reference position to an external portion at a data transmission time in the own device, and a fourth transmission delay time from a measurement reference position to an external portion at a data transmission time in the other device, the time synchronization method comprising:

a step of measuring a propagation delay time between the own device and the other device by transmitting and receiving time synchronization information to and from the other device;

a step of correcting the measured propagation delay time based on the stored delay time information; and a step of performing time synchronization between the own device and the other device based on the corrected propagation delay time, wherein the vehicle-mounted device is capable of relaying data at three or more communication ports, pieces of the delay time information are in one-to-one correspondence with the communication ports, and the vehicle-mounted device stores a piece of the delay time information corresponding to a portion of the communication ports among the three or more communication ports, and in the step of correcting the propagation delay time, the measured propagation delay time is corrected based on the stored delay time information corresponding to the portion of the communication ports.

\* \* \* \* \*